US012772155B2

(12) United States Patent
Collet et al.

(10) Patent No.: US 12,772,155 B2
(45) Date of Patent: Oct. 20, 2026

(54) MANAGEMENT OF PARTIALLY SERVED NETWORK SLICES

(71) Applicant: THALES DIS FRANCE SAS, Meudon (FR)

(72) Inventors: Hervé Collet, La Ciotat (FR); Alain Raguenet, Auriol (FR)

(73) Assignee: THALES DIS FRANCE SAS, Meudon (FR)

( * ) Notice: Subject to any disclaimer, the term of this patent is extended or adjusted under 35 U.S.C. 154(b) by 339 days.

(21) Appl. No.: 18/433,650

(22) Filed: Feb. 6, 2024

(65) Prior Publication Data

US 2025/0254606 A1 Aug. 7, 2025

(51) Int. Cl.
*H04W 48/16* (2009.01)
*H04W 12/40* (2021.01)

(52) U.S. Cl.
CPC ........... *H04W 48/16* (2013.01); *H04W 12/40* (2021.01)

(58) Field of Classification Search
CPC ..... H04W 48/16; H04W 12/40; H04W 8/183; H04W 60/04; H04W 48/18
USPC .......................................................... 455/434
See application file for complete search history.

(56) References Cited

U.S. PATENT DOCUMENTS

2008/0300017 A1* 12/2008 Choi .................. H04N 21/4182 455/558
2021/0329539 A1* 10/2021 Surisetty ............... H04W 48/16
2022/0286861 A1 9/2022 Siryy et al.
2022/0361135 A1* 11/2022 Won ...................... H04W 60/04
2023/0217513 A1 7/2023 Hashmi et al.

OTHER PUBLICATIONS

International Search Report (PCT/ISA/210) and Written Opinion (PCT/ISA/237) mailed on May 8, 2025 by the European Patent Office as the International Searching Authority for current International Application No. PCT/EP2025/051436 [13 pages].
3rd Generation Partnership Project; Technical Specification Group Services and System Aspects; System architecture for the 5G System (5GS); Stage 2 (Release 18); 3GPP Standard; 3GPP TS 23.501, 3rd Generation Partnership Project (3GPP); Retrieved from the Internet: URL:https://ftp.3gpp.org/Specs/archive/23_series/23.501/23501-i40.zip 23501-140.docx; Par. [5.15.2]; par.[5.15.4] ; par. [5.15.18]-par.[5.15.9]; paragraph [5.30.2.4].

* cited by examiner

*Primary Examiner* — Huy C Ho

(57) ABSTRACT

Provided is a monitor for management of network slices by a communication device (ME) having a secure element (USIM), said communication device being compliant with at least a technology implementing network slicing using a route selection policy, said method comprising the steps of, for the communication device active in a Registration Area of a network of the technology implementing network slicing, said Registration Area comprising Tracking Areas: requesting a given slice at the network; receiving from the network a slice status and slice information for the given slice comprising a list of Tracking Areas where the given slice is supported in the current Registration Area; and, in answer to a polling request from the secure element or in an event-based notification, sending a partially served slice status and the list of Tracking Areas where the given slice is supported to the secure element.

10 Claims, 2 Drawing Sheets

MANAGEMENT OF PARTIALLY SERVED NETWORK SLICES

FIELD OF THE INVENTION

The present invention relates to a method to monitor the management of network slices which can be partially supported in a sub-set of Tracking Area TA in a same Registration Area RA by a communication device having a secure element.

The invention also pertains to a communication device and to a secure element implementing said method.

BACKGROUND OF THE INVENTION

5G Network slice is used in 5G to provide adapted QoS to specific applications. Currently five slice service types (SST) are defined as disclosed in 3GPP TS 23.501, clause 5.15.2.2, but it is awaited that this number will increase with the 5G needs developments. Also, in each five slices service type, differentiators specifically depending on the operator generate a multiplication of the identifiers of the slices in the environment of the device.

With 5G slicing introduction, application should ensure that served slices is aligned with its data and/or power consumption, performance and latency requirements when slice is available. The slice management is thus a growing challenge.

As defined in the standards, a communication device (ME in the following) selects a network slice based on user equipment routing selection policy (URSP) rules provided either by the network or provided by the USIM. Such URSP rules are generally under the control of an operator (PLMN). A secure element (USIM in the following) is advantageously used, said USIM being configured by a Home PLMN with at least such URSP rules. Such a secure element is installed in the ME.

3GPP TS 31.111 specification enables an USIM to request the status relative to slices based on a polling mechanism. More precisely, specification was agreed related to PROVIDE LOCAL INFORMATION 'slice(s) information' which is a way for an USIM application to retrieve the information if slices are served only.

Current 3GPP TS 31.111 specification also enables an USIM to receive the status relative to slices based on an event mechanism. Currently, the network informs the ME with the following slice information: allowed S-NSSAIs values the ME could use in the Serving PLMN or SNPN in the current Registration Area, served slice which is served by the network, Rejected slice, with rejection cause in below list: S-NSSAI not available in the current PLMN or SNPN, S-NSSAI not available in the current Registration Area, S-NSSAI not available due to the failed or revoked network slice-specific authentication and authorization, S-NSSAI not available due to maximum number of UEs reached.

In improvements in Release 18, a slice can now be partially supported on a same Registration Area (RA) in a sub-set of Tracking Area(s) (TA) of the RA. This is illustrated on FIG. 1 where three slices MIoT, eMBB, V2X illustrated by three different lines are supported on a sub-set of the Tracking Areas of several Registration Areas distinguished by different patterns.

The partially supported slice(s) are not part of the current slices' information provided to USIM. Some USIM processes associated to specific slice take long period of time to be achieved, e.g. onboard key generation, SUCI calculation, and knowing as soon as possible when a slice has been selected, partially or not, can be advantageously used to hide the processing time. QoS could also be improved by the USIM or a remote server when Slice are partially supported only for a list Tracking Area(s).

Currently, the USIM cannot get the status relative to partially supported slices management made by the ME. Thus, it cannot start slice related processes when a slice request is accepted or rejected by the network of a partial Tracking Areas while minimizing the power consumption of the card.

Further alternative and advantageous solutions would, accordingly, be desirable in the art.

SUMMARY OF THE INVENTION

The present invention aims at reliably monitoring the slice management when slices are partially available on a sub-set of Tracking Areas in a given registering area The present invention is defined, in its broadest sense, as a method to monitor the management of network slices by a communication device (ME) having a secure element (USIM), said communication device being compliant with at least a technology implementing network slicing using a route selection policy, said method comprising the steps of, for the communication device active in a Registration Area of a network of the technology implementing network slicing, said Registration Area comprising Tracking Areas:

- requesting a given slice at the network;
- receiving from the network a partially served slice status and slice information for the given slice comprising a list of Tracking Areas where the given slice is supported in the current Registration Area;
- in answer to a polling request from the secure element or in an event-based notification, sending a partially supported slice status and the list of Tracking Areas where the given slice is supported to the secure element.

The invention proposes the network to provide the communication device with a list of Tracking Areas of the Registration Area where the communication device is registered as a first original aspect. This aspect is not known in the prior art. The invention further creates new slice status which are "partially allowed" and "partially rejected" status that can be sent to the secure element. The list of Tracking Areas is forwarded with partially allowed/rejected status to the secure element. The invention is useful whatever is the currently effective acceptation or rejection of the slice by the network. Indeed, the partially status informs the secure element that all the Registration Area is not fully served for a given slice.

According to an advantageous feature, the communication device further supporting a USIM application toolkit framework implementing event download envelops, said method comprises a preliminary step, for the secure element, to register to a slice event defined in the USIM application toolkit framework supported by the communication device, the event-based notification using an event download envelop.

This feature corresponds to the definition of a specific event download envelop adapted to carry the slice information of the invention to the secure element USIM.

According to another advantageous feature, the method of the invention further comprises the step, for the secure element, to record the list of Tracking Areas where the given slice is supported in the Registration Area where the communication device is registered, said method further comprises the step of, for the communication device, providing an information on the currently used Tracking Area to the secure element, and the step, for the secure element, based on the list of Tracking Areas where the given slice is supported and on an information of the currently used Tracking Area, when the currently used Tracking Area is in the list, performing at least one process associated to the given slice.

This feature enables the secure element to perform processes in advance or as soon as it is detected that the communication device is in Tracking Areas where a needed slice is served. Typically, some processes can thus be done in hidden time before the result of the process to be required by the network or the device. This is typically the case for anticipating time consuming computation. The invention indeed enables the secure element to start slice related processes without waiting for a command to do so. Associated process comprises a computation of new rules for the route selection policy, including updating, by the secure element, in its memory, the stored rules for the route selection policy (URSP rules). Such processes also include cryptographic calculations involving a slice status, slice information and at least one cryptography configuration parameter of the secure element.

In general, the invention enables to start time consuming processes while the result of the cryptographic calculation is not even yet requested. This enables to make such resource and time-consuming processes in hidden time. The invention thus enables to anticipate cryptographic computation, e.g. SUCI calculation, onboard key generation, on first EVENT confirming slice availability before the application really use the slice and associated cryptographic computation.

According to another advantageous feature, the method comprises the step of, for the secure element, building, a Tracking Area map where the given slice is supported or not supported.

Such a map is useful when, on the field and moving, the communication device may need to anticipate calculations for the entrance in a given slice. It may include slice availability statistics computation.

Advantageously, the list of Tracking Areas where the given slice is supported comprises Tracking Areas of the Registration Area where the communication device is registered.

This feature enables to anticipate even better movements of the communication device not only in the current Registration Area but also in neighboring Registration Areas.

The present invention also relates to a communication device having a secure element (USIM), said communication device being configured to monitor the management of network slices, said communication device being compliant with at least a technology implementing network slicing using a route selection policy, said communication device being active in a Registration Area of a network of the technology implementing network slicing, said Registration Area comprising Tracking Areas, said communication device being configured to:

- request a given slice at the network, to receive from the network a slice status and slice information for the given slice comprising a list of Tracking Areas where the given slice is supported in the current Registration Area;
- in answer to a polling request from the secure element or in an event-based notification, sending "partially allowed" or "partially rejected" slice status and the list of Tracking Areas where the given slice is supported to the secure element.

Such a communication device monitors the slice management in a situation where slices are geographically partially supported in a same Registration Area. The granularity of the slice management is thus improved.

The invention also relates to a secure element installed in a communication device (ME) configured to monitor the management of network slices with the secure element (USIM), said communication device being compliant with at least a technology implementing network slicing using a route selection policy, said secure element being configured to, when the communication device is active in a Registration Area of a network of the technology implementing network slicing, said Registration Area comprising Tracking Areas, receive a partially allowed/rejected slice status and slice information comprising a list of Tracking Areas where the given slice is supported in the current Registration Area.

Advantageously, the communication device further supporting a USIM application toolkit framework implementing event download envelops, the secure element is further configured to register to a slice event defined in the USIM application toolkit framework supported by the communication device, the event-based notification using an event download envelop.

Such a registration enables the secure element to receive automatically the slice status according to the invention and slice information according to the invention, i.e. including a Tracking Areas list.

Preferably, the secure element is further configured to record the list of Tracking Areas where the given slice is supported in the Registration Area where the communication device is registered, and, when the communication device provides an information on the currently used Tracking Area to the secure element, to perform at least one process associated to the given slice based on the list of Tracking Areas where the given slice is supported and on an information of the currently used Tracking Area, when the currently used Tracking Area is in the list.

Such a secure element has the possibility to trigger processes right away after an information that the communication just entered in a Tracking Area where the slice is supported.

Advantageously the secure element of the invention is further configured to build a Tracking Area map where the given slice is supported and not supported.

Such a Tracking Area map enables the secure element to have a quick retrieval of the slices' support.

According to a specific feature, the list of Tracking Areas where the given slice is supported comprises Tracking Areas of the Registration Area where the communication device is registered.

To the accomplishment of the foregoing and related ends, one or more embodiments comprise the features hereinafter fully described and particularly pointed out in the claims.

BRIEF DESCRIPTION OF DRAWINGS

The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION OF THE INVENTION

Figure 1:
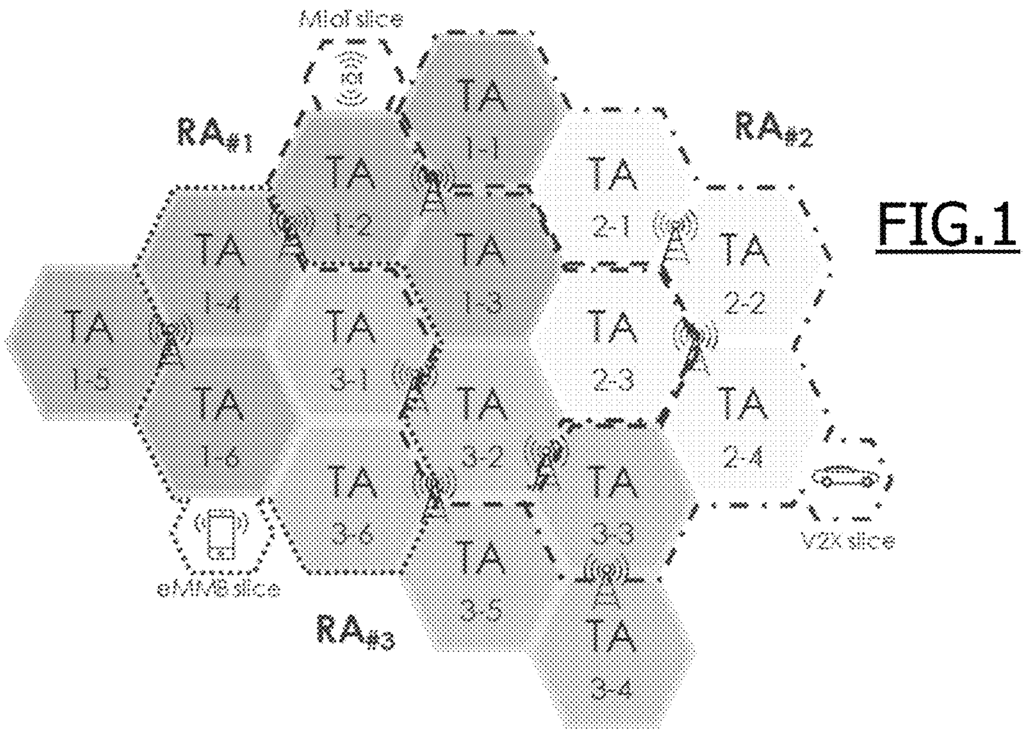
FIG. 1 illustrates partially supported slices in several Registration Areas.

For a more complete understanding of the invention, the invention will now be described in detail with reference to the accompanying drawing. The detailed description will illustrate and describe what is considered as a preferred embodiment of the invention. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and as claimed hereinafter. The same elements have been designated with the same references in the different drawings. For clarity, only those elements and steps which are useful to the understanding of the present invention have been shown in the drawings and will be described.

FIG. 1 schematically shows a network environment where slices are partially supported in besides defined Registration Areas RA. On this figure, three Registration Areas RA1, RA2 and RA3 are defined. As defined in the standard, the RA are constituted by several Tracking Areas TA. RA1 thus comprises six TA, i.e. TA1-1 to TA1-6, RA2 comprises four TA, i.e. TA2-1 to TA2-4, RA3 comprises six TA, i.e. TA3-1 to TA3-6. The Registration Areas are distinguished on FIG. 1 using different patterns.

Three slices are represented on FIG. 1. These slices are supported by sub-sets of Tracking Areas. Thus, a first slice MIoT is supported in four Tracking Areas TA1-2, TA1-3, TA2-3, TA3-2. A second slice V2X is supported in five Tracking Areas TA1-1, TA2-1, TA2-2, TA2-4, TA3-3. A third slice eMBB is supported in four Tracking Areas TA1-4, TA1-6, TA3-1, TA3-6.

In such a situation, the invention is interesting for a communication device which, while being in a Tracking Area of a Registration Area and registered at this Registration Area, has an application requesting a network access for which a slice X has been selected regarding URSP rules. Indeed, while receiving a Registration Area information on the supported slices as in the prior art, the communication device cannot currently detect that, regarding the Tracking Area where the communication device is located, a slice is supported or not.

According to the slice management by polling mechanism of the prior art, 3GPP Standard specifies only for USIM application, implemented in polling mode, to send on regular basis a PROVIDE LOCAL INFORMATION related to slices to get the current Slices status. Thus, it is possible for the secure element to have the information about the Allowed or Rejected slices in answer to the polling. Only the slices fully supported, i.e. on all Tracking Areas of the current Registration Area, are sent in response to current polling event, which restrict a lot the capacity of the secure element to monitor the connectivity behavior. Today, there is no means to monitor the partially allowed or rejected slices in current Registration Area in polling mode and thus no means to establish statistics or any artificial intelligence in the USIM, for example to adapt the routing selection policy. Thus, the USIM is never aware when slice status or information is updated in the ME based on information received from network when given slice is supported only for a subset of Tracking Areas in all the Tracking Areas defined for the current Registration Area, whatever is this information.

According to the slice management using event-based notifications, it is possible for the communication device to push slice status and slice information to the secure element. In addition to information related to the acceptation of a given slice, such slice information can be a rejection information with the rejection reason. Similarly to polling mechanism, the slice information are sent to the secure element only if slice is supported on all Tracking Areas of the current Registration Area.

Figure 2A:
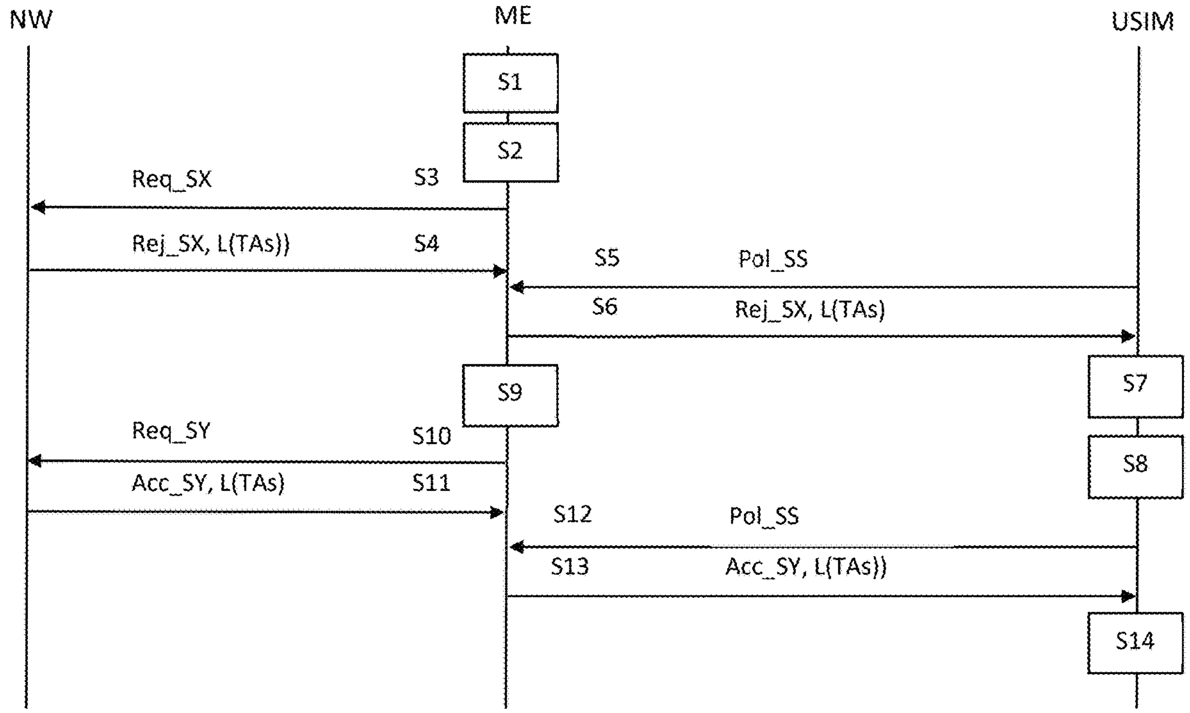
FIGS. 2A and 2B show time diagrams of slice management mechanisms according to, respectively, a first and second embodiment of the invention.
Figure 2B:
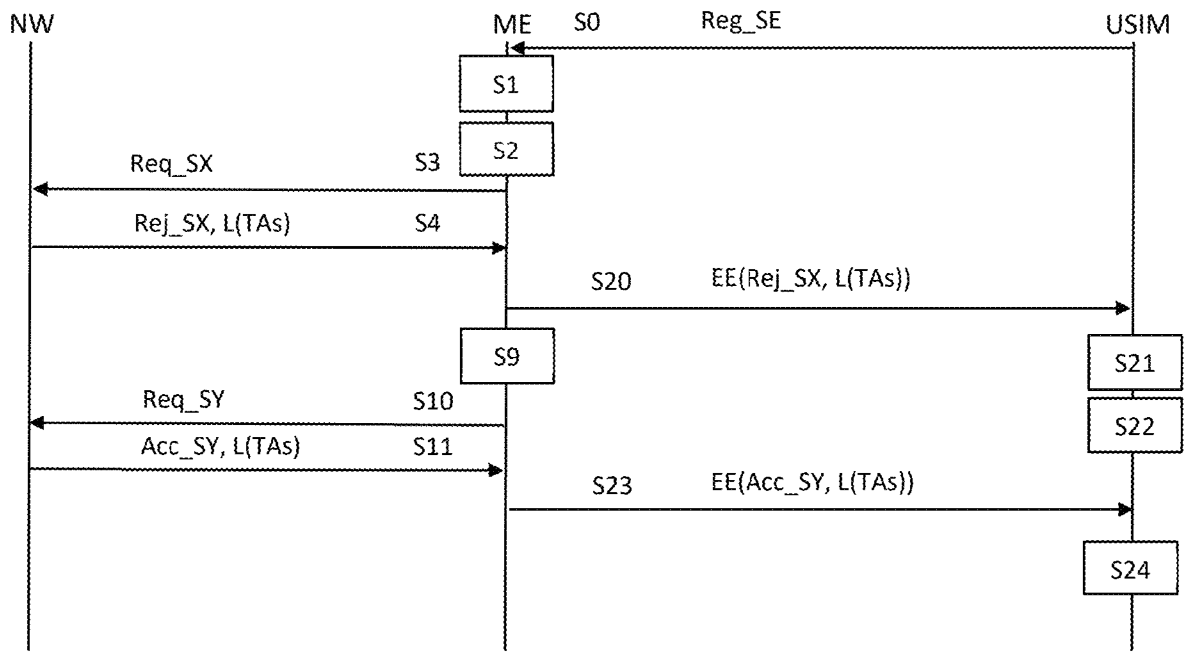

FIGS. 2A and 2B are time diagrams illustrating the method of the invention according to two embodiments.

A first embodiment is based on a polling mechanism and the second on an even-based notification mechanism. All time diagrams of the specification which follows show exchanges between a network NW, a communication device ME and a secure element USIM. Said secure element USIM is typically a SIM card of any form factors, e.g. removable, embedded or integrated. It can also be a Trusted Execution Environment TEE or any type of secure element configured to store sensitive data on behalf of a third party, not being held by the user of the user equipment UE. Typically, the USIM belongs to an operator of the network NW, which is typically a PLMN. Other kinds of network are however also targeted according to the invention.

The device is typically a terminal or a mobile equipment ME as defined in the ETSI or 3GPP standard documents. It is here noted that the handling of the communication device routing selection policy URSP stored in the USIM is not here disclosed in detail in the specification as it is known in the prior art. In general, the routing selection policies URSP are managed by operators that are in relation with the device. Thus, the home network operator and a visited network operator can have influence on the content of the URSP. On the other hand, the URSP rules in the USIM is currently controlled by the Home network operator but other configuration involving visited network could be contemplated in the future in specific situations.

An application requests a network access at the ME in a step S1. In a step S2, the ME evaluates URSP rules and select slice X. A slice request Req_SX is then sent by the ME to the network NW in a step S3. In answer, the network NW sends a rejection Rej_SX of the slice X request in a step S4. One of the previously presented reason for rejection is advantageously associated. According to the invention, the network NW includes a list of Tracking Areas L(TAs). Even if the network would provide a slice information including a list of Tracking Areas where the given slice is supported according to a main aspect of the invention, the currently defined polling mechanism will not forward the information to the secure element as only slice information supported on all the Tracking Areas of current Registration Area are today provided to the secure element according to the polling mode.

It is here further noted that, in the prior art, even in the event-based mode, the communication device ME makes nothing from an information relative to the list of Tracking Areas where the requested slice is available and there is no possibility for the secure element to react.

FIG. 2A presents the case where the secure element USIM uses a polling mechanism to get information related to the slices. In a step S5, the secure element thus sends a polling regarding the slice status Pol_SS. According to the invention, in the case illustrated on FIG. 2A where the communication device has recently received a slice rejection Rej_SX together with a list of Tracking Areas L(TAs) where the requested slice is supported, the communication device then answers to the polling by sending in a step S6 a partially rejected slice status Rej_SX together with the list of Tracking Areas L(TAs) where the slice X is supported.

When the secure element USIM gets besides an information on the currently serving Tracking Area, the secure element USIM checks in a step S7 if the currently serving Tracking Area is in the list of Tracking Areas as received in the list L(TAs) where the slice is supported. According to the invention, the secure element advantageously receives real time information on the serving Tracking Area and/or on awaited serving Tracking Areas in case where the communication device is in movement. Regarding the present or expected serving Tracking Areas and the list of Tracking Areas where the given slice is supported, the secure element USIM can consequently trigger a process associated to the given slice in a step S8.

As the rejection can among others be due to congestion or temporary conditions, it enables the secure element to anticipate calculations and, more generally, to anticipate process to be performed for the usage of the given slice.

Of course, several slices can be monitored in parallel regarding their respective list of Tracking Areas where the corresponding slice is supported.

If, in a step S9, the ME then typically further evaluates another URSP rule to select a slice Y, e.g. a new request for a new PDU session establishment by an application within the ME using Slice Y. This triggers the ME to perform a step S10 of requesting slice Y Req_SY. Then, the network NW accepts Acc_SY this request for the slice Y in a step S11. According to the invention, the network NW also appends a list of allowed Tracking Areas L(TAs) to the acceptation.

In the illustrative example of FIG. 2A, a polling message for a slice status Pol_SS is sent shortly after the reception of the acceptation of the slice Y by the USIM in a step S12. The ME then answers to the USIM by informing it of the availability of the served slice Y Acc_SY in a step S13. According to the invention, the list of Tracking Areas L(TAs) where slice Y is supported is appended to the answer. In a step S14, the secure element starts process related to the slice Y and can also anticipate evolution of the slice availability regarding the movement of the communication device if ever.

It is here noted that if ever the slice Y was accepted, and no polling event occurred quickly after this acceptation, the USIM would have been informed only at the time of the next polling event and possibly out of the acceptation period. In such a case, the occasion to monitor the slice is lost.

In addition, it is indeed known that the polling mode has the drawbacks to generate an over battery consumption linked to regular command to be sent from the USIM to the ME and to miss some Slices information if slice status is not requested in the right timing. With the polling mechanism the information is available on a regular basis but not available as soon as the slice status and/or slice information is updated.

The event-based mechanism as shown on FIG. 2B is an improvement enabling to reduce the power consumption. FIG. 2B shows a time diagram of the method of the invention using event-based notification. In a preliminary step S0 the secure element registers to a slice event-based service. Then, as disclosed on FIG. 2B, an application in the communication device ME requests a network access for the ME in a step S1. In a step S2, the ME evaluates URSP rules and select slice X. A slice request Req_SX is then sent by the ME to the network NW in a step S3. In answer, the network NW sends a rejection Rej_SX of the slice X request in a step S4. One of the previously presented reason for rejection is advantageously associated. According to the invention, the network NW includes a list of Tracking Areas L(TAs) to the rejection.

According to the method of the invention in the event-based mode, following the step S4, the communication device ME prepares an Event Download envelop EE according to what is defined in an application toolkit. According to the invention, said event download envelop EE contains the slice status which is a partially rejected slice and the list of Tracking Areas where the given slice X is supported as slice information.

Here the slice status is thus partially rejected and a slice information is the list of Tracking Areas where the given slice is supported.

The slice status pushed to the card in event envelop can thus be "partially rejected" together with the list of Tracking Areas. Such information are not defined and thus even less available between the device ME and the secure element USIM according to the currently standardized specification.

The device ME then sends the event download envelop EE(Rej_SX, L(TAs)) to the secure element USIM in a step S20.

In details, the slice status for each slice could be:

- allowed, advantageously associated to Single Network Slice Selection Assistance Information (S-NSSAIs) values that the ME may use in the Serving PLMN or SNPN in the all Tracking Areas of current Registration Area,
- partially allowed, associated to a slice information comprising the list of Tracking Areas where the slice is allowed,
- rejected, advantageously with a rejection cause.
- partially rejected, associated to a slice information comprising the list of Tracking Areas where the slice is rejected, The Slice information is a list of Tracking Areas where the slice is supported.

Per TS 31.111, currently, in addition to the set of events defined in ETSI TS 102.223 clause 4.7, the event according to the invention may also be reported to the USIM as soon as the USIM is registered to the corresponding event, each event being associated to a class as defined in the USIM application toolkit.

The invention may use one of the classes that was not used before. This offers the opportunity to the secure element USIM to register to such a slice event. Step S0 of FIG. 2B illustrates such a preliminary registration of the secure element at the device ME, said device supporting the application toolkit.

An event list data object contains information of associated event trigged, i.e. slice status. Advantageously the device ME sets the event with the additional following data objects: Device identities, Access Technology, Slice status, Slice information (with or without mapping information), and Rejected slice information (with or without mapping information) depending of the execution context.

Device identities data object are set to source=Network NW and destination=secure element USIM. Access technology data object contains the access technology of the current serving cell.

The secure element checks if the currently serving Tracking Area is present in the received list L(TAs) in a step S21 and can trigger process related to the given slice in anticipation to an effective connection using the given slice in a step S22.

If the device is not camping on any cell, the access technology data object shall not be present. In this case, the list of Tracking Areas L(TAs) serves to anticipate on the next serving Tracking Areas and on the needs for process(es) to be triggered to ease the slice entering.

As presented on FIG. 2B, after the rejection of slice X, in a step S9, the ME may then further evaluate another URSP rule to select a slice Y, e.g. a new request for a new PDU session establishment by an application within the ME using Slice Y. The ME then typically makes a request for another slice Y in a step S10 and get an acceptation for slice Y in a step S11. Again, the device ME prepares an Event Download envelop according to what is defined in an application toolkit. It then sends an event envelop EE(Acc_SY, L(TAs)) to the USIM in a step S23. It contains the slice status and slice information, i.e. the response received from the network NW relative to the network slice request sent from the device ME to the network NW. This time, the status is Allowed and the information is the list of Tracking Areas L(TAs).

The slice status and slice information are then used by the USIM to enable processes linked to slice events, influencing in return the slice management at the ME. Based on the received Slice Event from the device ME and configuration information in the USIM, the USIM can start to perform slice related processing in a step S24.

In the examples of FIG. 2, the secure element USIM adapts URSP rules to slice status and slice information and advantageously to historical slice status and slice information. These rules are provided to the device ME for the device to update the routing selection policy URSP to be used for the network slice management. Such an update of the URSP is advantageous for the device ME to have always a behavior adapted to the availability of the slices in real time. Based on the recorded status, the USIM typically computes a new priority order for the locally stored URSP rules and provide the prioritized URSP rules to the device ME.

As a general consequence, the USIM processes take advantages of the invention. Specifically, the invention is advantageously combined with processes associated to specific slice which take long period of time to be achieved.

Such processes are, in particular, onboard key generation, a Subscription Concealed Identifier (SUCI) calculation and any other processes implicating cryptographic calculation. Knowing as soon as possible when a slice has been selected is advantageously used to hide the processing time.

The reception of the event envelop of the invention advantageously triggers the USIM to start an onboard key generation process if the currently serving Tracking Area is in the list or if it is expected the communication device to soon enter in one of the Tracking Areas as listed. In this case, with the invention, the secure element can start to use key generation parameters, e.g. type of key/algorithm, key length, required quality of the key, to generate a key. Such keys may be used in end-to-end encryption process, device authentication, for example in IoT Safe feature, etc. . . . .

The Envelop command contains information relative to the slice that has been accepted, i.e. at least a Slice identity. The rest of the information needed for example for a key generation has been configured in the USIM by the owner of the keys, which is either the HPLMN or a third party different from the HPLMN.

With the reception of the slice status of the invention in near real time together with a currently serving Tracking Area at the secure element USIM, it may start a SUCI calculation for a Slice requiring Network Specific Slice Authentication and Authorization, e.g. in the case of Slice SIM use case.

With the invention, the USIM can also compute in near real time a Tracking Areas' map. QoS can consequently be improved by the USIM to anticipate the entering in a next Tracking Area. Based on the recorded slice status, the USIM computes advantageously an availability score for each slice in each Tracking Area.

With the invention, in general, the USIM is thus able to perform statistics of slice availability and to perform corresponding adjustment, typically in URSP rules, to improve faster connectivity to adapted QoS via a specific slice.

With an improved geographical granularity of the availability of the slices, the invention enables the behavior of the secure element USIM to be changed without any delay regarding the slice availability. This obtained result will become more and more useful as the quantity of devices benefiting from a network slicing will increase.

In the above detailed description, reference is made to the accompanying drawings that show, by way of illustration, specific embodiments in which the invention may be practiced. These embodiments are described in sufficient detail to enable those skilled in the art to practice the invention. The above detailed description is, therefore, not to be taken in a limiting sense, and the scope of the present invention is defined only by the appended claims, appropriately interpreted.

The invention claimed is:

1. A method to monitor the management of network slices by a communication device having a secure element (USIM), said communication device being compliant with at least a technology implementing network slicing using a route selection policy, said method comprising the steps of, for the communication device active in a Registration Area of a network of the technology implementing network slicing, said Registration Area comprising Tracking Areas:
- requesting a given slice at the network;
- receiving from the network a slice status and slice information for the given slice comprising a list of Tracking Areas where the given slice is supported in the current Registration Area; and,
- in answer to a polling request from the secure element or in an event-based notification, sending a partially supported slice status and the list of Tracking Areas where the given slice is supported to the secure element.

2. The method according to claim 1, wherein, the communication device further supporting a USIM application toolkit framework implementing event download envelops, said method comprises a preliminary step, for the secure element, to register to a slice event defined in the USIM application toolkit framework supported by the communication device, the event-based notification using an event download envelop.

3. The method according to claim 1, further comprising the step, for the secure element, to record the list of Tracking Areas where the given slice is supported in the Registration Area where the communication device is registered, said method further comprising the step of, for the communication device, providing an information on the currently used Tracking Area to the secure element, and the step, for the secure element, based on the list of Tracking Areas where the given slice is supported and on an information of the currently used Tracking Area, when the currently used Tracking Area is in the list, performing at least one process associated to the given slice.

4. The method according to claim 1, said method comprising the step of, for the secure element, building, a Tracking Area map where the given slice is supported or not supported.

5. The method according to claim 1, wherein the list of Tracking Areas where the given slice is supported comprises Tracking Areas of the Registration Area where the communication device is registered.

6. A Communication device having a secure element (USIM), said communication device being configured to monitor the management of network slices, said communication device being compliant with at least a technology implementing network slicing using a route selection policy, said communication device being active in a Registration Area of a network of the technology implementing network slicing, said Registration Area comprising Tracking Areas, said communication device being configured to:

request a given slice at the network, to receive from the network a slice status and slice information for the given slice comprising a list of Tracking Areas where the given slice is supported in the current Registration Area;

in answer to a polling request from the secure element or in an event-based notification, sending a "partially allowed" or "partially rejected" slice status and the list of Tracking Areas where the given slice is supported to the secure element.

7. A Secure element (USIM) installed in a communication device, wherein the communication device is configured to monitor the management of network slices with the secure element (USIM), said communication device is compliant with at least a technology implementing network slicing using a route selection policy, said secure element is configured to:

receive a partially allowed/rejected slice status and slice information comprising a list of Tracking Areas where the given slice is supported in the current Registration Area when the communication device is active in a Registration Area of a network of the technology implementing network slicing, said Registration Area comprising Tracking Areas.

8. The secure element according to claim 7, wherein, the communication device further supporting a USIM application toolkit framework implementing event download envelops, the secure element is further configured to register to a slice event defined in the USIM application toolkit framework supported by the communication device, the event-based notification using an event download envelop.

9. The secure element according to claim 7, being further configured to record the list of Tracking Areas where the given slice is supported in the Registration Area where the communication device is registered, and, when the communication device provides an information on the currently used Tracking Area to the secure element, to perform at least one process associated to the given slice based on the list of Tracking Areas where the given slice is supported and on an information of the currently used Tracking Area, when the currently used Tracking Area is in the list.

10. The secure element according to claim 7, being further configured to build a Tracking Area map where the given slice is supported and not supported.

* * * * *